US011182807B1

(12) United States Patent
Ullal et al.

(10) Patent No.: US 11,182,807 B1
(45) Date of Patent: Nov. 23, 2021

(54) OLIGOPOLY DETECTION

(71) Applicant: International Business Machines Corporation, Armonk, NY (US)

(72) Inventors: Sidharth Ullal, Chennai (IN); Raghuveer Prasad Nagar, Kota (IN); Neelesh Gupta, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/870,322

(22) Filed: May 8, 2020

(51) Int. Cl.
*G06Q 30/02* (2012.01)
*G06N 20/00* (2019.01)
*G06N 20/20* (2019.01)

(52) U.S. Cl.
CPC ........ *G06Q 30/0201* (2013.01); *G06N 20/20* (2019.01); *G06Q 30/0206* (2013.01)

(58) Field of Classification Search
None
See application file for complete search history.

(56) References Cited

U.S. PATENT DOCUMENTS

| 7,065,495 B1* | 6/2006 | Lundgren | ........ | G06Q 10/06375 705/7.29 |
| 2005/0006467 A1* | 1/2005 | Sweeney | .............. | G06Q 20/201 235/383 |
| 2006/0195355 A1* | 8/2006 | Lundgren | .............. | G06Q 90/00 705/70 |
| 2006/0259421 A1* | 11/2006 | Maass | .................... | G06Q 30/08 705/39 |
| 2009/0265198 A1* | 10/2009 | Lester | ................ | G06Q 30/0282 705/318 |
| 2011/0099040 A1* | 4/2011 | Felt | ......................... | G06Q 50/30 705/7.12 |
| 2014/0122370 A1* | 5/2014 | Jamal | ................. | G06Q 30/0206 705/348 |
| 2014/0279352 A1* | 9/2014 | Schaefer | ................ | G06Q 40/04 705/37 |

(Continued)

OTHER PUBLICATIONS

Beneke et al. "Artificial Intelligence and Collusion" (2019) (retrieved from https://doi.org/10.1007/s40319-018-00773-x) (Year: 2019).*

(Continued)

*Primary Examiner* — Sujay Koneru
(74) *Attorney, Agent, or Firm* — Troutman Pepper Hamilton Sanders LLP

(57) ABSTRACT

A computer-implemented method for detecting oligopoly in a data processing system, the method comprising: pretending to be a first competing AI pricing engine for a business provider; querying, by a second competing AI pricing engine, the first competing AI pricing engine for a first price; providing, by the first competing AI pricing engine, a plurality of first prices to the second competing AI pricing engine; querying, by the first competing AI pricing engine, the second competing AI pricing engine for a second price; providing, by the second competing AI pricing engine, a plurality of second prices to the second competing AI pricing engine; identifying, by the processor, a correlation between the plurality of first prices and the plurality of second prices using a machine learning technique; and flagging, by the processor, the second competing AI pricing engine, as a possible oligopoly participant.

14 Claims, 5 Drawing Sheets

(56) References Cited

U.S. PATENT DOCUMENTS

| | | | |
|---|---|---|---|
| 2015/0242856 A1* | 8/2015 | Dhurandhar | G06Q 50/01 |
| | | | 705/44 |
| 2016/0092897 A1* | 3/2016 | Natarajan | G06Q 30/0206 |
| | | | 705/7.35 |
| 2016/0225042 A1* | 8/2016 | Tran | G06F 11/3006 |
| 2016/0292018 A1* | 10/2016 | Laredo | G06F 9/54 |
| 2017/0109767 A1* | 4/2017 | Shpanya | G06Q 30/0206 |
| 2018/0048532 A1* | 2/2018 | Poort | H04L 47/70 |
| 2018/0053264 A1* | 2/2018 | Rowley | G06Q 30/0222 |
| 2018/0101877 A1* | 4/2018 | Song | G01C 21/3492 |
| 2019/0009133 A1* | 1/2019 | May | A63B 24/0075 |
| 2019/0122258 A1* | 4/2019 | Bramberger | G06Q 30/0248 |
| 2019/0251509 A1* | 8/2019 | Simpson | G06Q 30/08 |
| 2019/0295113 A1 | 9/2019 | Bharti et al. | |
| 2020/0057918 A1* | 2/2020 | Shin | G06K 9/6257 |
| 2020/0226652 A1* | 7/2020 | Karna | G06Q 30/0605 |
| 2021/0019761 A1* | 1/2021 | Dhekane | G06N 5/003 |
| 2021/0035251 A1* | 2/2021 | Wen | G06Q 30/0631 |

OTHER PUBLICATIONS

Van de Geer et al. "Dynamic Pricing and Learning with Competition: Insights from the Dynamic Pricing Challenge at the 2017 INFORMS RM & Pricing Conference" (2018) (Year: 2018).*

* cited by examiner

US 11,182,807 B1

OLIGOPOLY DETECTION

TECHNICAL FIELD

The present application generally relates to oligopoly detection, and more particularly, to detection of an oligopoly among different artificial intelligence (AI) pricing engines.

BACKGROUND

Oligopolies are prevalent throughout the world and appear to be increasing rapidly. Unlike a monopoly, where one corporation dominates a certain market, an oligopoly consists of a few companies having significant influence over an industry. While these companies are considered competitors within a specific market, they tend to cooperate with each other to benefit as a whole, which can lead to higher prices for consumers.

Artificial intelligence (AI) pricing engines are introduced to set prices for products and services. When AI pricing engines set prices, they will be able to "communicate" with each other by means of pricing and easily conclude that cooperation (i.e., setting up an oligopoly) is the best long-term strategy. However, it is legal for the AI pricing engines to query prices with each other, because knowing the prices of competitors is critical to setting price in a free market.

Therefore, it is difficult to differentiate between an oligopoly and a legal price query, and thus it is desired to introduce an approach of detecting an oligopoly between AI pricing engines.

SUMMARY

A computer-implemented method for detecting an oligopoly between competing artificial intelligence (AI) pricing engines in a data processing system comprising a processor and a memory comprising instructions which are executed by the processor, the method including: pretending, by the processor, to be a first competing AI pricing engine representative of a business provider; querying, by a second competing AI pricing engine, the first competing AI pricing engine for a first price; providing, by the first competing AI pricing engine, a plurality of first prices to the second competing AI pricing engine; querying, by the first competing AI pricing engine, the second competing AI pricing engine for a second price; providing, by the second competing AI pricing engine, a plurality of second prices to the first competing AI pricing engine; identifying, by the processor, a correlation between the plurality of first prices and the plurality of second prices using a machine learning technique; and flagging, by the processor, the second competing AI pricing engine, as a possible oligopoly participant. The first competing AI pricing engine communicates with the second competing AI pricing engine through Morse codes, wherein each of the plurality of first prices ends with at least one "0" or "1," and all the "0" or "1" can be strung together in sequence to form a first word, phrase, or sentence encoded in the Morse codes.

In another illustrative embodiment, a computer program product comprising a computer usable or readable medium having a computer readable program is provided. The computer readable program, when executed on a processor, causes the processor to perform various ones of, and combinations of, the operations outlined above with regard to the method illustrative embodiment.

In yet another illustrative embodiment, a system is provided. The system may comprise a full question generation processor configured to perform various ones of, and combinations of, the operations outlined above with regard to the method illustrative embodiment.

Additional features and advantages of this disclosure will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF EXEMPLARY EMBODIMENTS

The present invention may be a system, a method, and/or a computer program product implemented on a cognitive system. The computer program product may include a computer readable storage medium (or media) having computer readable program instructions thereon for causing a processor to carry out aspects of the present invention.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. IBM Watson™ is an example of one such cognitive system which can process human-readable language and identify inferences between text passages with human-like accuracy at speeds far faster than human beings and on a much larger scale. In general, such cognitive systems can perform the following functions:

- Navigate the complexities of human language and understanding
- Ingest and process vast amounts of structured and unstructured data
- Generate and evaluate hypotheses
- Weigh and evaluate responses that are based only on relevant evidence
- Provide situation-specific advice, insights, and guidance Improve knowledge and learn with each iteration and interaction through machine learning processes Enable decision making at the point of impact (contextual guidance)

Scale in proportion to the task

Extend and magnify human expertise and cognition

Identify resonating, human-like attributes and traits from natural language

Deduce various language-specific or agnostic attributes from natural language

High degree of relevant recollection from data points (images, text, voice) (memorization and recall)

Predict and sense with situation awareness that mimic human cognition based on experiences Answer questions based on natural language and specific evidence In one aspect, the cognitive system can be augmented with an oligopoly detection system. This disclosure provides an AI-based oligopoly detection system, method, and computer product, which can detect competing entities participating in an oligopoly in a high volume and high-frequency dynamic pricing environment.

Figure 1:
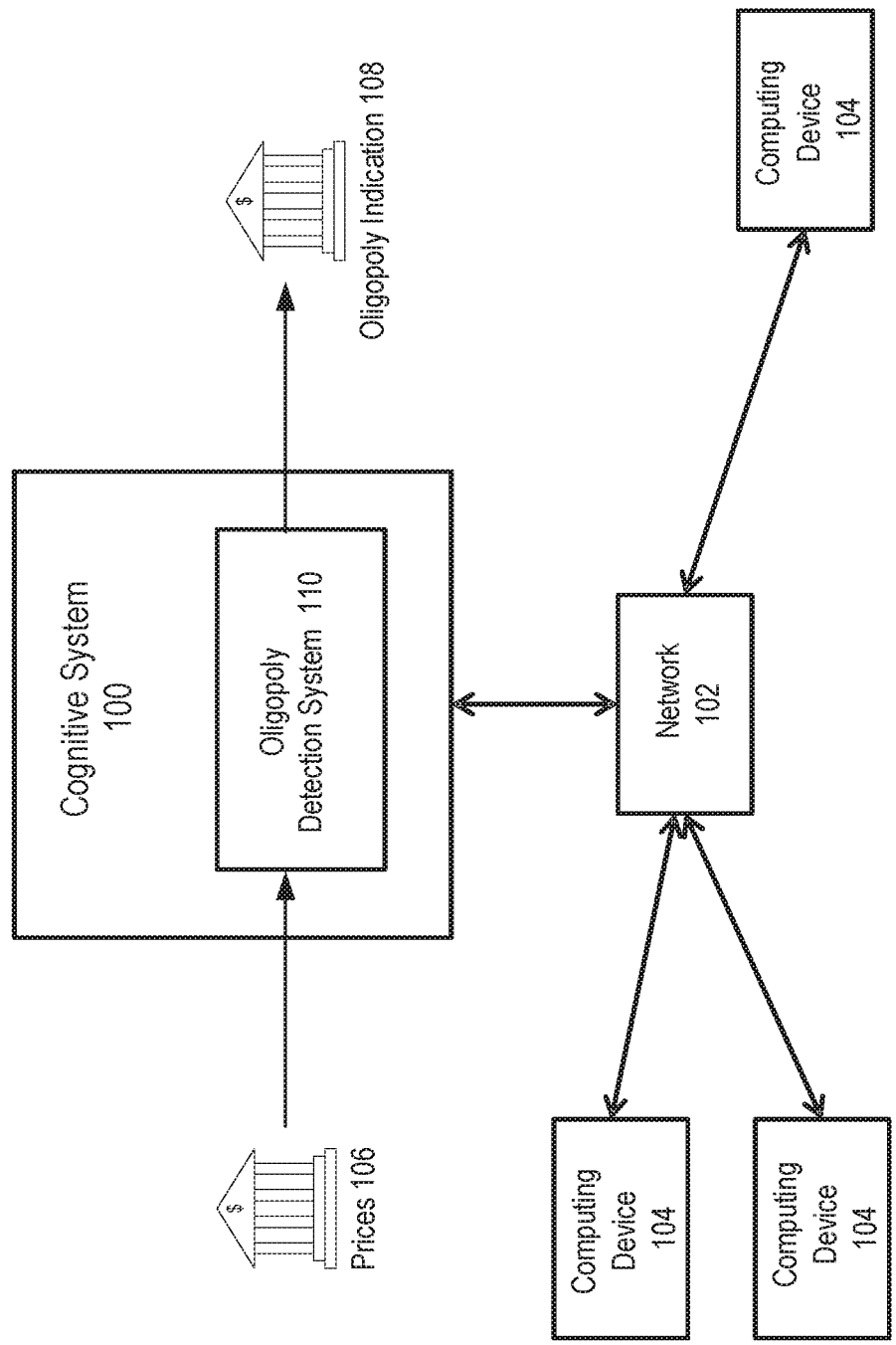
FIG. 1 depicts a schematic diagram of one illustrative embodiment of a cognitive system 100 implementing an exemplary oligopoly detection system 110 in a computer network.

FIG. 1 depicts a schematic diagram of one illustrative embodiment of a cognitive system 100 implementing an exemplary oligopoly detection system 110 in a computer network 102. The cognitive system 100 is implemented on one or more computing devices 104 (comprising one or more processors and one or more memories, and potentially any other computing device elements generally known in the art including buses, storage devices, communication interfaces, and the like) connected to the computer network 102. The computer network 102 includes multiple computing devices 104 in communication with each other and with other devices or components via one or more wired and/or wireless data communication links, where each communication link comprises one or more of wires, routers, switches, transmitters, receivers, or the like. Other embodiments of the cognitive system 100 may be used with components, systems, sub-systems, and/or devices other than those that are depicted herein. The computer network 102 includes local network connections and remote connections in various embodiments, such that the cognitive system 100 may operate in environments of any size, including local and global, e.g., the Internet. The cognitive system 100 is configured to implement an oligopoly detection system 110 that can automatically identify an oligopoly between competing entities that provide products or/and services to consumers. The oligopoly detection system 110 receives prices 106 from different pricing AI engines representing different competing entities, and then outputs an oligopoly indication 108 if prices 106 from the different competing entities are almost the same and much higher than the "fair" price.

Figure 2:
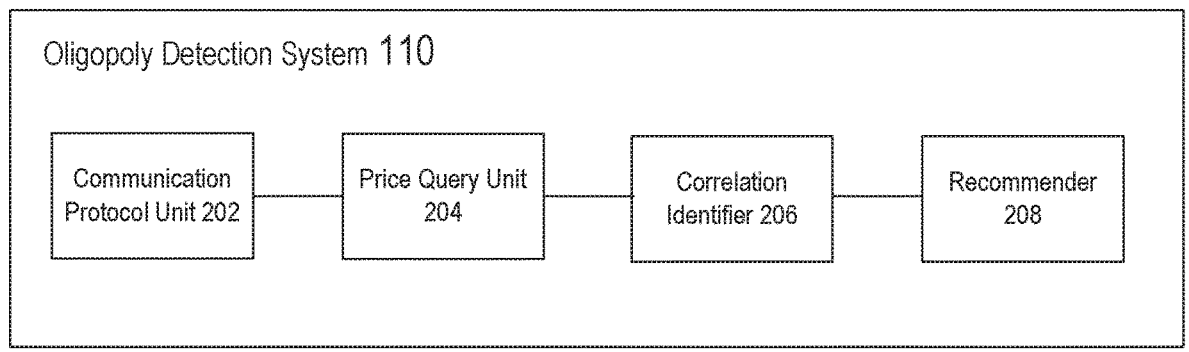
FIG. 2 depicts a schematic diagram of one illustrative embodiment of the oligopoly detection system 110, according to embodiments described herein.

FIG. 2 depicts a schematic diagram of one illustrative embodiment of the oligopoly detection system 110, according to embodiments described herein. As shown in FIG. 2, in an embodiment, the oligopoly detection system 110 includes communication protocol unit 202, price query unit 204, correlation identifier 206, and recommender 208. The communication protocol unit 202 is configured to identify which cryptographic approach business providers (e.g., product/service providers) are using for a potential oligopoly, and use the identified cryptographic approach to communicate with the business providers. The price query unit 204 is configured to query prices set by the business providers. The correlation identifier 206 is configured to detect a correlation between prices set by different business providers (i.e., competitors), applying a machine learning technique, which indicates a suspicious oligopoly. The recommender 208 is configured to provide a recommendation on how to address the suspicious oligopoly.

The oligopoly detection system can have access to multiple data sources, such as: a) historical and real-time prices of all competitors for the type of products/services; b) a plurality of factors influencing the prices, like oil price, taxes, geography, weather, government policies, etc. The oligopoly detection system is trained with the plurality of factors that influence the prices set by participating competitors (represented by pricing AI engines) and can predict a "fair" price based on the plurality of factors; c) user suggestions and complaints; d) government regulations and laws; and e) communication protocols, like cryptography, ciphers, etc., between participating competitors.

The oligopoly detection system will launch an investigation into participating competitors represented by pricing AI engines in case of one or more of the following scenarios: a) user suggestions/complaints about unfair pricing; b) abnormally high deviations from the "fair" price set by the oligopoly detection system; c) high fluctuations in price, which may indicate that the pricing AI engines are in the process of reaching an agreement for collusion; d) a process triggered regularly, e.g., every week, every month, etc.

The oligopoly detection system can take on different personas when interacting with pricing AI engines while investigating for an oligopoly (i.e., collusion between participating competitors). In an embodiment, the oligopoly detection system can act as another pricing AI engine (e.g., another cab aggregator). The oligopoly detection system, acting as a pricing AI engine, can test one or more other AI pricing engines. The oligopoly detection system can bait one or more other AI pricing engines through a communication protocol (e.g., Morse codes) to see whether they follow along or not. The oligopoly detection system can apply a machine learning technique, e.g., multi-linear regression technique or multivariate linear regression technique, to detect a correlation between prices. For example, if the price of one seller (represented by an AI pricing engine) depends on the price change of other sellers (represented by other AI pricing engines), a dependency (i.e., a correlation) indicative of collusion is detected. In an embodiment, the multi-linear regression is used if there is only one dependent variable. For example, the dependent variable can be "a price for a seller," e.g., the price set by a cab aggregator. In another embodiment, the multivariate linear regression is used if there is more than one dependent variable. For example, two dependent variables can be "a price for a seller" and "a date range for the price dependency." For example, the price from the seller S1 is influenced by prices from the seller S2 and the seller S3. But the price from the seller S1 is influenced by the price from the seller S2 only during winters while the price from the seller S1 is influenced by the price from the seller S3 only during summers.

In another embodiment, the oligopoly detection system can act as a customer. The oligopoly detection system can pretend to be a customer, and query AI pricing engines suspected of collusion. The oligopoly detection system can apply a machine learning technique, e.g., multi-linear regression technique or multivariate linear regression technique, to detect a correlation between prices. For example, if the prices provided by different AI pricing engines are almost the same, then a correlation between prices indicative of collusion is detected.

If a suspicious oligopoly between AI pricing engines is detected, the oligopoly detection system can request the AI pricing engines to submit their decision trees used for setting prices for human review. The reviewer can mine the decision trees for collusion patterns.

Figure 3:
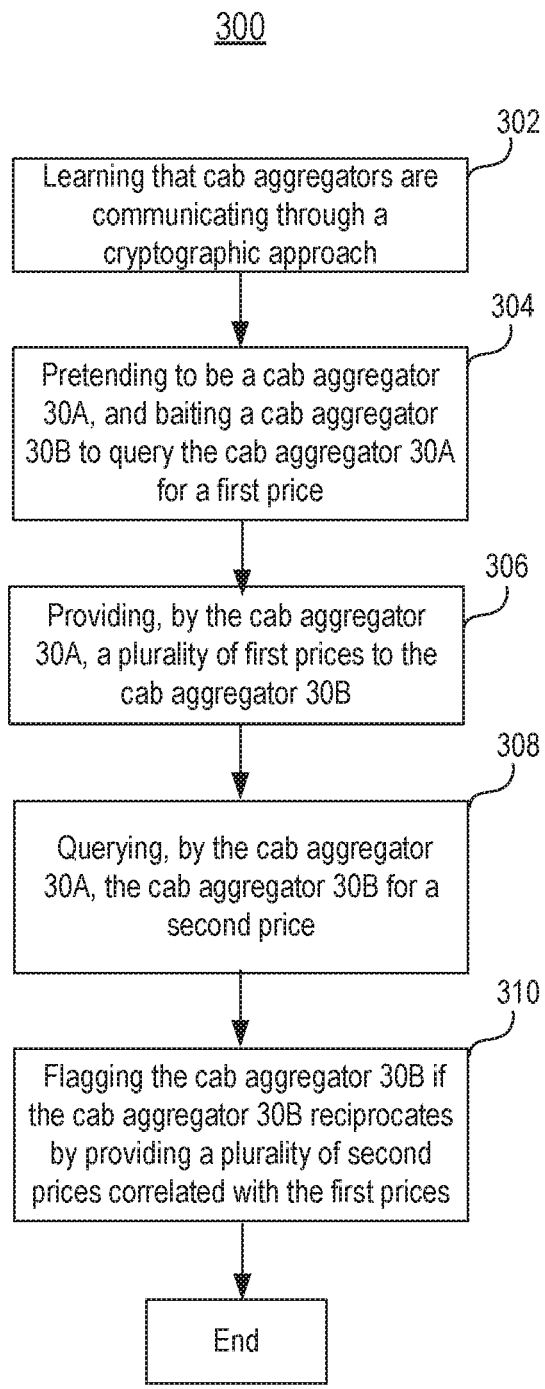
FIG. 3 illustrates a flowchart diagram depicting a method 300 of detecting an oligopoly between cab aggregators, according to embodiments described herein.

FIG. 3 illustrates a flowchart diagram depicting a method 300 of detecting an oligopoly between cab aggregators, according to embodiments described herein.

At step 302, the oligopoly detection system learns that cab aggregators represented by AI pricing engines are communicating through a cryptographic approach, such as using Morse codes.

At step 304, the oligopoly detection system pretends to be a competing AI pricing engine 30A representing the cab aggregator 30A, and baits the AI pricing engine 30B representing the cab aggregator 30B to query the AI pricing engine 30A for a price.

At step 306, the AI pricing engine 30A provides a plurality of prices to the AI pricing engine 30B. Each price ends with one or more "0" or "1," because Morse codes can be represented as a binary code. All the "0" or "1" can be strung together in sequence to form a word, phrase, or sentence. For example, the word "cooperation," the phrase "same price," the sentence "let's stick to the same price" can be formed. With this approach, the AI pricing engine 30B can realize that the AI pricing engine 30A is using Morse codes to communicate with it, and can understand the baiting word, phrase, or sentence that the AI pricing engine 30A conveys.

At step 308, the AI pricing engine 30A then begins to query the AI pricing engine 30B for prices.

At step 310, if the AI pricing engine 30B reciprocates by providing prices, each of which ends with one or more "0" or "1," and all the "0" or "1" can be strung together in sequence to form a word, phrase, or sentence (e.g., "agree," "same price," "We agree with cooperation"), then the AI pricing engine 30B is flagged with an intent to collude with other competitors for an oligopoly.

Figure 4:
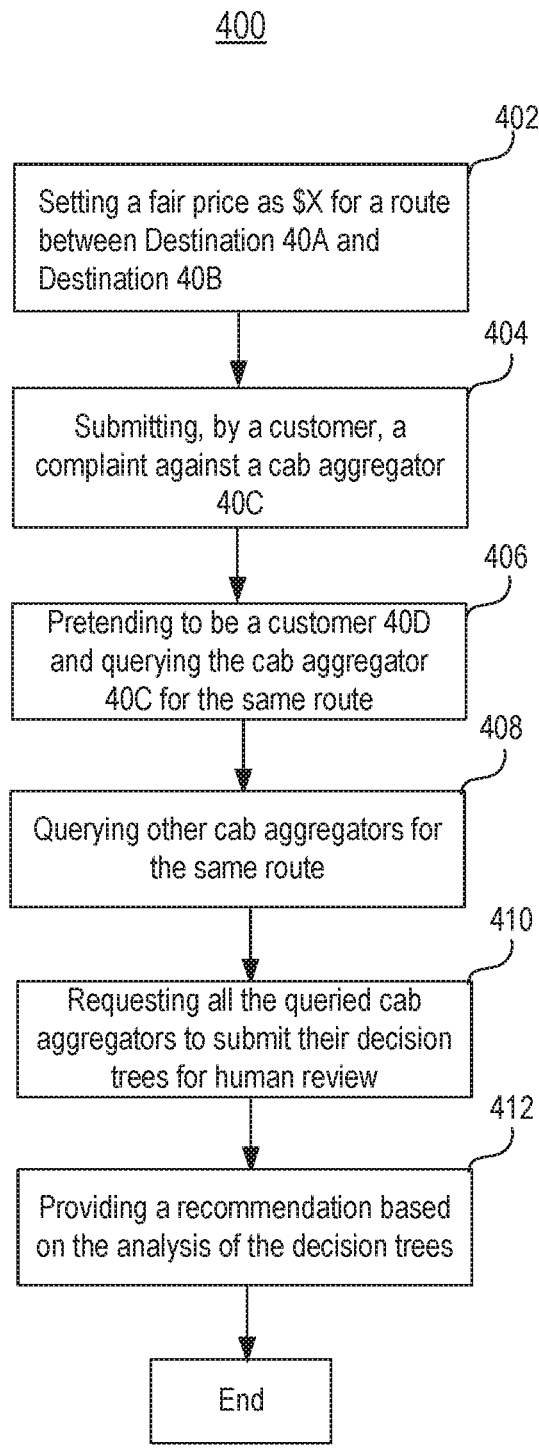
FIG. 4 illustrates a flowchart diagram another method 400 of detecting an oligopoly between cab aggregators, according to embodiments described herein.

FIG. 4 illustrates a flowchart diagram depicting another method 400 of detecting an oligopoly between cab aggregators, according to embodiments described herein.

At step 402, the oligopoly detection system sets a fair price as $X for a distance between the Destination 40A and the Destination 40B.

At step 404, a customer submits a complaint that $Y charged by the cab aggregator 40C (represented by the AI pricing engine 40C) is too high.

At step 406, the oligopoly detection system pretends to be a customer 40D and queries the AI pricing engine 40C for a price between the Destination 40A and the Destination 40B. The AI pricing engine 40C provides the price of $Y, which is much higher than the fair price $X.

At step 408, the oligopoly detection system queries other cab aggregators for the same route, and all the other cab aggregators all provide the price of $Y.

At step 410, the oligopoly detection system requests all the queried cab aggregators to submit their decision trees for human review. A decision tree is a flowchart-like structure in which each internal node represents a "test" on an attribute, each branch represents the outcome of the test, and each leaf node represents a class label (a decision taken after computing all attributes). The paths from the root to the leaf represent classification rules.

At step 412, the oligopoly detection system provides a recommendation based on the analysis of the decision trees. The oligopoly detection system can alert AI regulators (e.g., governmental administrators in charge of oligopoly detection, or ethical AI NGOs such as Elon Musk's Open AI, etc.) that collusion has been detected. The oligopoly detection system can further provide a recommendation, e.g., revision of the decision trees of the cab aggregators represented by AI pricing engines, or setting a price within a threshold of a fair price.

The oligopoly detection system can further work as a "fair" price checker. For example, an "ethical" pricing AI engine can query the oligopoly detection system to know whether a price change proposed by this pricing AI engine is "fair" to the consumer or not.

Figure 5:
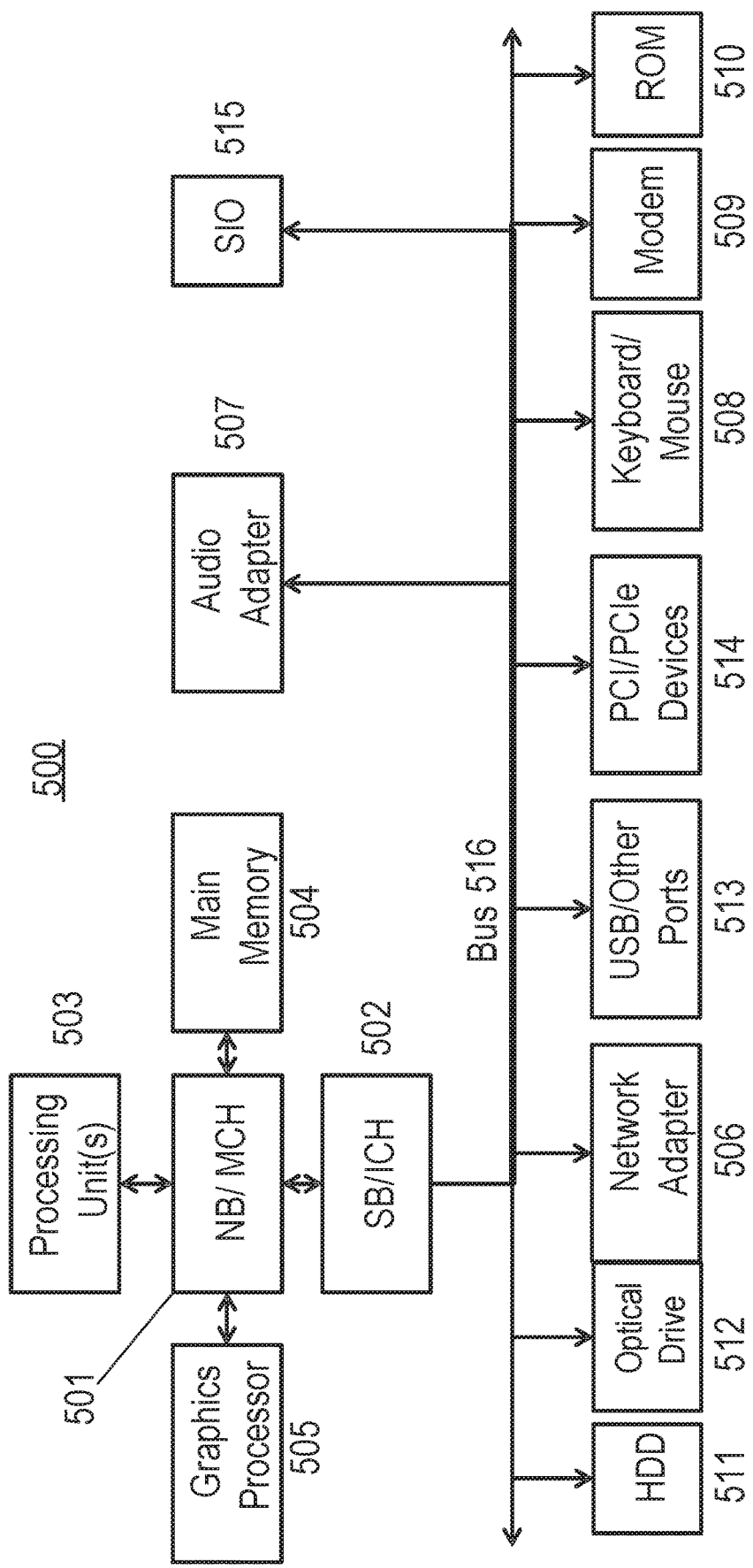
FIG. 5 is a block diagram of an example data processing system 500 in which aspects of the illustrative embodiments are implemented.

FIG. 5 is a block diagram of an example data processing system 500 in which aspects of the illustrative embodiments are implemented. Data processing system 500 is an example of a computer, such as a server or a client, in which computer usable code or instructions implementing the process for illustrative embodiments of the present invention are located. In one embodiment, FIG. 5 represents a server computing device, such as a server, which implements the oligopoly detection system 110 and cognitive system 100 described herein.

In the depicted example, the data processing system 500 can employ a hub architecture including a north bridge and memory controller hub (NB/MCH) 501 and south bridge and input/output (I/O) controller hub (SB/ICH) 502. Processing unit 503, main memory 504, and graphics processor 505 can be connected to the NB/MCH 501. Graphics processor 505 can be connected to the NB/MCH 501 through an accelerated graphics port (AGP).

In the depicted example, the network adapter 506 connects to the SB/ICH 502. The audio adapter 507, keyboard and mouse adapter 508, modem 509, read-only memory (ROM) 510, hard disk drive (HDD) 511, optical drive (CD or DVD) 512, universal serial bus (USB) ports and other communication ports 513, and the PCI/PCIe devices 514 can connect to the SB/ICH 502 through bus system 516. PCI/PCIe devices 514 may include Ethernet adapters, add-in cards, and PC cards for notebook computers. ROM 510 may be, for example, a flash basic input/output system (BIOS). The HDD 511 and optical drive 512 can use an integrated drive electronics (IDE) or serial advanced technology attachment (SATA) interface. The super I/O (SIO) device 515 can be connected to the SB/ICH.

An operating system can run on processing unit 503. The operating system can coordinate and provide control of various components within the data processing system 500. As a client, the operating system can be a commercially available operating system. An object-oriented programming system, such as the Java™ programming system, may run in conjunction with the operating system and provide calls to the operating system from the object-oriented programs or applications executing on the data processing system 500. As a server, the data processing system 500 can be an IBM® eServer™ System p® running the Advanced Interactive Executive operating system or the Linux operating system. The data processing system 500 can be a symmetric multiprocessor (SMP) system that can include a plurality of processors in the processing unit 503. Alternatively, a single processor system may be employed.

Instructions for the operating system, the object-oriented programming system, and applications or programs are located on storage devices, such as the HDD 511, and are loaded into the main memory 504 for execution by the processing unit 503. The processes for embodiments of the full question generation system can be performed by the processing unit 403 using computer usable program code, which can be located in a memory such as, for example, main memory 504, ROM 510, or in one or more peripheral devices.

A bus system 516 can be comprised of one or more busses. The bus system 516 can be implemented using any type of communication fabric or architecture that can provide for a transfer of data between different components or devices attached to the fabric or architecture. A communication unit such as the modem 509 or network adapter 506 can include one or more devices that can be used to transmit and receive data.

Those of ordinary skill in the art will appreciate that the hardware depicted in FIG. 5 may vary depending on the implementation. For example, the data processing system 500 includes several components which would not be directly included in some embodiments of the oligopoly detection system 110. However, it should be understood that the oligopoly detection system 110 may include one or more of the components and configurations of the data processing system 500 for performing processing methods and steps in accordance with the disclosed embodiments.

Moreover, other internal hardware or peripheral devices, such as flash memory, equivalent non-volatile memory, or optical disk drives may be used in addition to or in place of the hardware depicted. Moreover, the data processing system 500 can take the form of any of a number of different data processing systems, including but not limited to, client computing devices, server computing devices, tablet computers, laptop computers, telephone or other communication devices, personal digital assistants, and the like. Essentially, data processing system 500 can be any known or later developed data processing system without architectural limitation.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN) and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present invention.

The system and processes of the Figures are not exclusive. Other systems, processes and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers, and processes can be implemented using hardware components, software components, and/or combinations thereof. No claim element herein is to be construed under the provisions of 35 USC. 112, sixth paragraph, unless the element is expressly recited using the phrase "means for."

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A computer-implemented method for detecting an oligopoly between competing artificial intelligence (AI) pricing engines in a data processing system comprising a processor and a memory comprising instructions which are executed by the processor, the method comprising:
    pretending, by the processor, to be a first competing AI pricing engine representative of a business provider;
    querying, by a second competing AI pricing engine, the first competing AI pricing engine for a first price;
    providing, by the first competing AI pricing engine, a plurality of first prices to the second competing AI pricing engine;
    querying, by the first competing AI pricing engine, the second competing AI pricing engine for a second price;
    providing, by the second competing AI pricing engine, a plurality of second prices to the first competing AI pricing engine;
    identifying, by the processor, a correlation between the plurality of first prices and the plurality of second prices using a machine learning technique; and
    flagging, by the processor, the second competing AI pricing engine, as a possible oligopoly participant,
    wherein the first competing AI pricing engine communicates with the second competing AI pricing engine through Morse codes, wherein each of the plurality of first prices ends with at least one "0" or "1," and all the "0" or "1" can be strung together in sequence to form a first word, phrase, or sentence encoded in the Morse codes.

2. The method of claim 1, wherein each of the plurality of second price ends with at least one "0" or "1," and all the "0" or "1" can be strung together in sequence to form a second word, phrase, or sentence in response to the first word, phrase, or sentence encoded in the Morse codes.

3. The method of claim 1, further comprising:
    requesting, by the processor, the second competing AI pricing engine to provide a decision tree for human review; and
    revising, by the processor, the decision tree to avoid the oligopoly.

4. The method of claim 1, further comprising:
    calculating, by the processor, a third price for the business provider as a fair price, wherein the third price is calculated based on a plurality of factors influencing the third price, including oil price, taxes, geography, weather, and government policies; and
    recommending, by the processor, the second competing AI pricing engine to use the third price.

5. The method of claim 4, further comprising:
    launching an investigation in case of one or more of the following scenarios: receiving a complaint from a real customer against the second competing AI pricing engine for a high price; the plurality of the second prices are higher than the fair price; the plurality of the second prices are fluctuating; the investigation is triggered in a predetermined period of time.

6. A computer program product for detecting an oligopoly between competing artificial intelligence (AI) pricing engines, the computer program product comprising a computer readable storage medium having program instructions embodied therewith, the program instructions executable by a processor to cause the processor to:
    calculate, by the processor, a first price for a business provider as a fair price, wherein the first price is calculated based on a plurality of factors influencing the first price, including oil price, taxes, geography, weather, and government policies;

pretend, by the processor, to be a customer of the business provider;

query, by the processor, a first competing AI pricing engine for a second price;

provide, by the first competing AI pricing engine, the second price to the pretended customer;

query, by the processor, a second competing AI pricing engine for a third price;

provide, by the second competing AI pricing engine, the third price to the pretended customer, wherein the second price and the third price are the same and are higher than the first price; and flag, by the processor, the first competing AI pricing engine and the second competing AI pricing engine, as possible oligopoly participants, wherein the processor is further caused to identify a correlation between the second price and the third price through a multivariate linear regression, and the multivariate linear regression uses two dependent variables: a price and a date range for price dependency.

7. The computer program product as recited in claim 6, wherein the processor is further caused to request the second competing AI pricing engine to provide a decision tree for human review; and revise the decision tree to avoid the oligopoly.

8. The computer program product as recited in claim 6, wherein the processor is further caused to recommend the first competing AI pricing engine and the second competing AI pricing engine to use the first price.

9. The computer program product as recited in claim 6, wherein the processor is further caused to launch an investigation in case of one or more of the following scenarios: receiving a complaint from a real customer against the first competing AI pricing engine for a high price; the second price is higher than the fair price; the second price is fluctuating; the investigation is triggered in a predetermined period of time.

10. A system for detecting an oligopoly between competing artificial intelligence (AI) pricing engines, comprising:

a processor configured to:

pretend to be a first competing AI pricing engine for a business provider;

query, by a second competing AI pricing engine, the first competing AI pricing engine for a first price;

provide, by the first competing AI pricing engine, a plurality of first prices to the second competing AI pricing engine;

query, by the first competing AI pricing engine, the second competing AI pricing engine for a second price;

provide, by the second competing AI pricing engine, a plurality of second prices to the first competing AI pricing engine;

identify a correlation between the plurality of first prices and the plurality of second prices using a machine learning technique; and flag the second competing AI pricing engine, as a possible oligopoly participant, wherein the first competing AI pricing engine communicates with the second competing AI pricing engine through Morse codes, wherein each of the plurality of first prices ends with at least one "0" or "1," and all the "0" or "1" can be strung together in sequence to form a first word, phrase, or sentence encoded in the Morse codes.

11. The system as recited in claim 10, wherein each of the plurality of second price ends with at least one "0" or "1," and all the "0" or "1" can be strung together in sequence to form a second word, phrase, or sentence in response to the first word, phrase, or sentence encoded in the Morse codes.

12. The system as recited in claim 10, wherein the machine learning technique is multi-linear regression or multivariate linear regression.

13. The system as recited in claim 10, the processor is further configured to request the second competing AI pricing engine to provide a decision tree for human review; and revise the decision tree to avoid the oligopoly.

14. The system as recited in claim 10, the processor is further configured to calculate a third price for the business provider as a fair price, wherein the third price is calculated based on a plurality of factors influencing the third price, including oil price, taxes, geography, weather, and government policies; and recommend the second competing AI pricing engine to use the third price.

* * * * *